July 11, 1933.  W. R. GILLIES  1,917,834
GASKET
Filed March 25, 1931    3 Sheets-Sheet 1
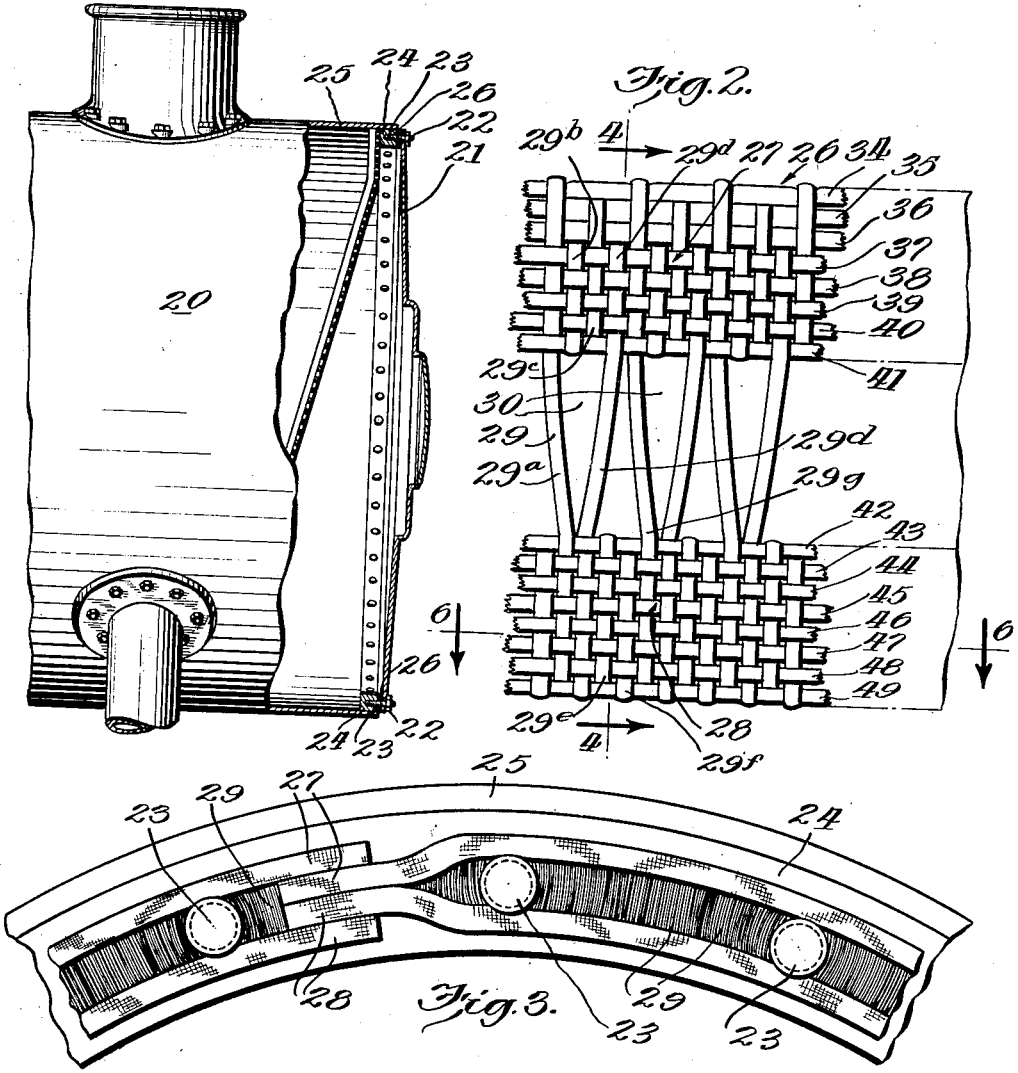
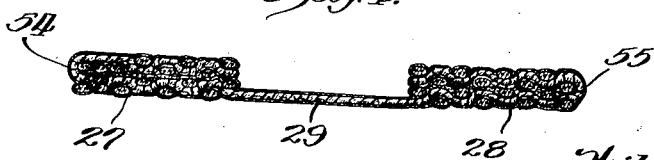
Inventor:
William R. Gillies
By Williams, Bradbury,
McCaleb & Hinkle
Attys.

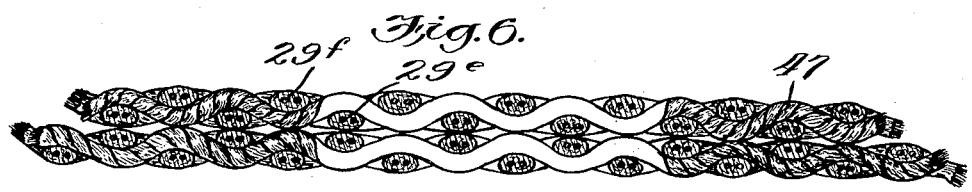
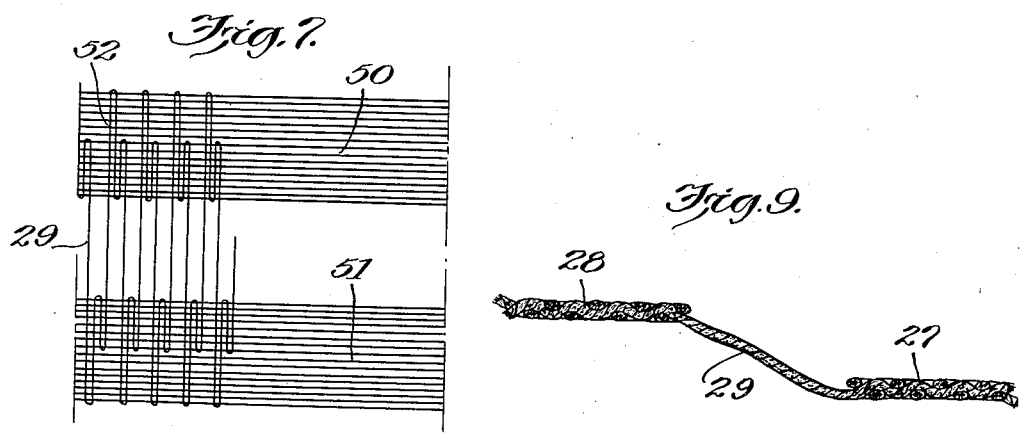
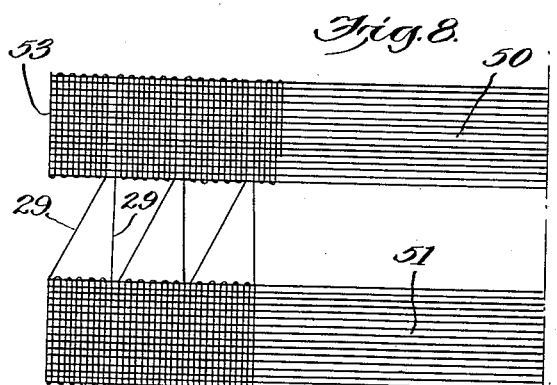

July 11, 1933.  W. R. GILLIES  1,917,834
GASKET
Filed March 25, 1931   3 Sheets-Sheet 3
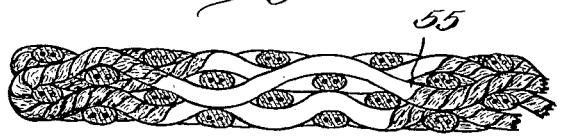
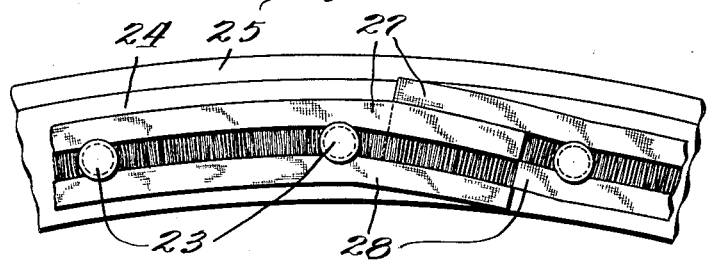
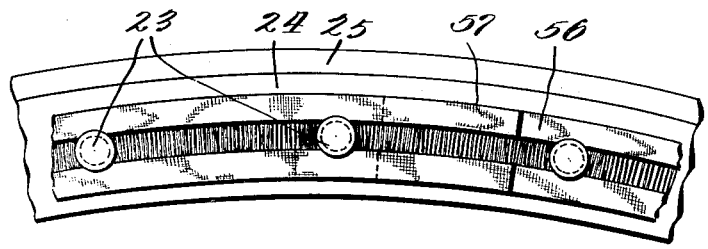
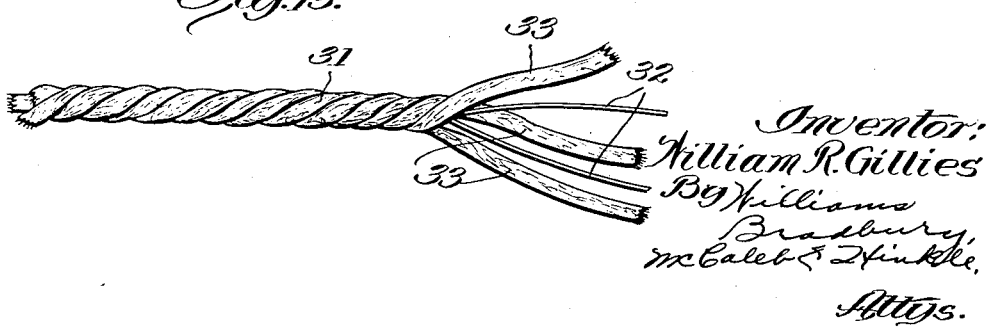

Patented July 11, 1933

1,917,834

UNITED STATES PATENT OFFICE

WILLIAM R. GILLIES, OF CHICAGO, ILLINOIS, ASSIGNOR TO UNION ASBESTOS & RUBBER COMPANY, OF CHICAGO, ILLINOIS, A CORPORATION OF ILLINOIS

GASKET

Application filed March 25, 1931. Serial No. 525,174.

The present invention relates to gaskets, and is particularly concerned with gaskets adapted to be used where projecting bolts or other fastening devices pass through the gasket.

One of the objects of the invention is the provision of an improved gasket material adapted to be used to form a gas-tight seal at a closed circular joint, and also adapted to be manufactured in tape form to be cut off in the lengths desired to form gaskets of any size with a gas-tight overlapped joint.

Another object is the provision of an improved gasket tape adapted to be conveniently applied over and about securing bolts or studs, without the necessity for measuring to locate apertures in the gasket, or the necessity to cut apertures for the bolts or studs.

Another object is the provision of an improved apertured gasket through which the fastening bolts may be passed at any desired point along a predetermined part of the gasket, without the necessity for cutting any of the threads of the gasket.

Another object is the provision of an improved gasket tape peculiarly adapted to perform a sealing joint of substantially uniform thickness between the adjacent ends of the tape when arranged in a closed circle or loop, with the ends of the tape overlapping.

Another object is the provision of an improved method of making gasket tape of the class described.

Another object is the provision of an improved front end gasket for locomotives or other boilers, which may be manufactured as a tape, so that it may be kept in stock and cut to any desired length for any size gasket, and which may be more quickly applied to the locomotive by virtue of adjustable apertures for the bolts or studs.

Other objects and advantages of the invention will be apparent from the following description and from the accompanying drawings, in which similar characters of reference indicate similar parts throughout the several views.

Referring to the drawings, of which there are three sheets;

Fig. 1 is an elevational view of the front end of the locomotive in partial section, showing one of the adaptations or uses of the present gasket;

Fig. 2 is an enlarged diagrammatic view showing the structure and weave of one embodiment of the gasket material;

Fig. 3 is a fragmentary view of a gasket employed as shown in Fig. 1, showing one of the types of overlapping joints;

Fig. 4 is an enlarged sectional view taken on the plane of the line 4—4 of Fig. 2, looking in the direction of the arrows;

Fig. 5 is a longitudinal sectional view taken through one of the layers of the woven fabric gasket;

Fig. 6 is a longitudinal sectional view taken on the plane of the line 6—6 of Fig. 2;

Fig. 7 is a diagrammatic line drawing showing one of the methods of weaving a gasket tape of this type;

Fig. 8 is another diagrammatic line drawing showing another method of weaving a gasket tape of the type described;

Fig. 9 is a transverse sectional view showing the disposition of the various parts of the tape during one of the steps of weaving, according to the improved method;

Fig. 10 is a transverse sectional view of a portion of the tape of another modification, woven with a plurality of layers;

Fig. 11 is a view similar to Fig. 3, showing a modified form of tape and modified joint;

Fig. 12 is another similar view of another modified form of joint;

Fig. 13 is an enlarged view of one of the threads employed in weaving the present gasket fabric.

Referring to Fig. 1, this is a fragmentary view of the front end of a locomotive boiler 20, showing one of the modes of installation and use of the present gasket material as a front end gasket. The locomotive boilers of this type are usually provided with a front end plate or cover 21, which is secured in place by a plurality of nuts 22 threaded on studs or bolts 23. The studs or bolts 23 are supported in a supporting ring 24 located at the open end of the boiler shell 25, and the gasket 26 is interposed between the end plate 21 and the ring 24, and secured in place by bolts 23 and nuts 22.

Under such conditions, it is usually necessary to provide a gasket having holes for the bolts 23 in order to secure the gasket in place and to employ all of the end area of the ring 24 to effect a sealing joint with the end plate 21, since the gasket 26 is clamped between the ring 24 and end plate 21.

With the devices of the prior art, it would be necessary to measure the spacing of the bolts 23 and provide appropriate bolt holes in the gasket, and this involves a considerable loss of time and labor in the application of the gasket. Furthermore, it was necessary to cut the threads and waste a predetermined amount of material in making bolt holes in ordinary gaskets, whereas the present gasket tape is capable of being applied to the use illustrated in Fig. 1, without the necessity for cutting any apertures, wasting any material, or losing any time in fitting the gasket to the engine.

A short length of the gasket tape 26 is illustrated in the enlarged plan view of Fig. 2. This gasket tape preferably consists of a pair of woven fabric portions 27 and 28 of predetermined width joined together by a plurality of filler threads 29, which latter threads are preferably spaced from each other to form the open spaces 30, but in some embodiments of the invention the filler threads at this point need not be spaced other than the spacing which is effected by the spreading of the filler threads when they are placed about a bolt.

The gasket tape 26 is preferably constructed of a plurality of asbestos threads which may be classified as warp threads and filler or transverse threads, and one of the threads 31 is illustrated in Fig. 13. The thread 31 preferably consists of a plurality of separate strands of fibers of asbestos, the fibers being twisted in one direction in the strand, and the strands being twisted in the opposite direction to form the thread 31. The asbestos fibers are preferably mixed with a small proportion of animal or vegetable fibers of longer length, such as cotton, for the purpose of facilitating the formation of the asbestos fibers into strands and threads, and the amount of cotton or other fiber employed with the asbestos will depend upon the quality of the asbestos fibers, their length, and the qualitiy of resultant thread desired. In some embodiments with particularly long asbestos fibers, the necessity for cotton or other long fibers is eliminated.

The thread 31 also preferably includes one or more reinforcing metallic wires, such as the brass wires 32 which are twisted in with the strands 33, thereby giving the thread a greater tensile strength and augmenting the increase in tensile strength which is provided by the use of the small percentage of cotton, but in some embodiments, the reinforcing wires may also be eliminated.

Referring to Fig. 2, I shall now describe the specific arrangement of the threads in the woven gasket tape of one embodiment of my invention. The tape 26 is preferably formed with two of the woven portions 27 and 28 spaced from each other, but secured together by the filler threads 29. In order to form the spaced fabric portions 27 and 28, the tape 26 is provided with a plurality of warp threads 34 to 41, and 42 to 49, respectively. Any number of warp threads may be used in each of these groups or series, but the warp threads are arranged in groups or series for the purpose of forming the spaced portions of fabric, whereas the intermediate space 30 is left substantially open by virtue of the absence of warp threads at this point, and also by the deminution of the amount of filler threads traversing the spaces between the fabric portions 27 and 28.

It will be understood that the present gasket tape may be woven upon ordinary weaving machines by adapting the weaving machines to carry out the method of manufacture described herein. The warp threads 34 to 49 ordinarily are carried by a number of separate reels, and the warp threads pass through the loom harness to the finished tape made by the loom. The filler threads 29 may be formed by a thread from a single reel or by a plurality of different threads, and the course of one of the filler threads will now be traced for the purpose of explaining the arrangement of the threads in the fabric.

The filler thread 29a may pass upward in Fig. 2, under warp 41, over warp 40, under warp 39, over warp 38, under warp 37, and over warp threads 34, 35 and 36, to the upper edge of the tape in Fig. 2. This filler thread may then pass downward underneath warp threads 34, 35, 36, being designated filler thread 29b, which passes over warp 37, under warp 38, over warp 39, under warp 40 and over warp 41.

The same thread may then be designated filler 29c, which passes under warp 41, over warp 40, under warp 39, over warp 38, under warp 37, over warps 35, 36, under warps 35, 36, returning as filler thread 29d.

The filler thread 29d is also interwoven with the respective warp threads of the fabric portion 27, but it traverses the space 30 between the fabric portions 27 and 28 to the fabric portion 28, where it is woven backward and forward as filler threads 29e and 29f and 29g.

It will thus be apparent that the structure shown in Fig. 2 may be produced by arranging the filler threads so that they are preferably interwoven with one group of warp threads, traversing the warp threads several times, after which the filler thread passes over to the other group of warp threads, which are traverse and interwoven several times, and thence back into the first group of warp threads.

The exact manner of weaving the fabric portions 27 and 28 may be varied considerably, but the fabric portions are preferably woven quite tightly so as to form a gasket of substantially uniform thickness and density, whereas the intermediate joining portions 29 of the filler threads extend loosely from one fabric portion 27 to the other fabric portion 28.

Referring to Figs. 7 and 8, these are diagrammatic line views showing a plurality of arrangements for the weaving of gasket tape of the type described. In the embodiment of Fig. 7, the groups 50 and 51 of warp threads are interwoven with the filler threads 52, which filler threads are alternately woven back and forth in the groups of warps 50, 51, and then passed over to the opposite group of warp threads. It will be evident from Fig. 7 that the number of joining threads 29 may be increased by decreasing the number of transverse movements of the shuttle for each group, and the filler threads need not in every case extend completely across the groups of warp threads 50, 51.

Referring to Fig. 8, in this embodiment the filler threads 53 each traverse the groups 50 and 51 of warp threads a multiplicity of times, after which the filler threads pass over in a diagonal direction to the opposite group of warp threads, forming the joining threads 29 which are spaced apart a greater distance than the joining threads 29 of Fig. 7.

It will be understood that in Figs. 7 and 8 the respective filler threads are actually pressed up closely against each other to form a close weave, and these figures merely illustrate diagrammatically, two of the specific shuttle movements which may be used in forming tape of the type desired.

Referring to Fig. 9, this is a fragmentary transverse section of tape illustrated in one of the positions which the parts of the tape assume during the weaving operation. In order to produce a tape having a minimum of joining threads 29, the shuttle is so arranged that the harness may elevate the respective groups of warp threads which are woven into the fabric portions 27 and 28 to different levels. Thus, in Fig. 9, the warp threads of fabric 28 are elevated above the warp threads of fabric 27 by the harness of the loom, and in effect one of the groups of warp threads, as, for instance, the warp threads of fabric 27, are moved out of operative engagement with the shuttle for a short period of time.

The method of producing a fabric of the type shown in Fig. 8, may thus consist in raising the group of warp threads 51 above the warp threads 50 after the manner shown in Fig. 9, and causing the shuttle to traverse the warp threads of the group 51 a plurality of times, after which the two groups of warp threads are brought to the same level and the shuttle traverses the whole tape over to the group 50.

The warp threads of the group 50 may then be elevated by the harness and the warp threads of the group 51 depressed in such manner that the shuttle may traverse the warp threads 50 a plurality of times, forming a length of the fabric portion 27, after which the warp threads are again brought to the same level and the shuttle passes over to the group 51 again forming one of the joining threads 29 and the process may be repeated any number of times.

The process of manufacturing a fabric of this type, therefore, consists in weaving relatively short lengths of the fabric portions at each side, and successively joining the fabric portions so woven with the fabric portions at the other side of the tape, so as to produce a tape having two or more fabric parts joined by intervening transverse threads.

It should be understood that the present fabric may be woven as a single ply, and so used, but the fabric portions are preferably provided with a plurality of plies, such as the two-ply tape shown in Fig. 4. The two-ply tape shown in Fig. 4 is preferably formed by weaving relatively wide fabric portions 27 and 28 joined by threads 29 and folding over the fabric portions 27 and 28 upon themselves respectively, along the lines 54 and 55 which extend longitudinally of the tape and parallel to its edges. The provision of a plurality of plies of fabric, gives the tape a thicker body, capable of absorbing a greater amount of impregnating material and having better resilient qualities, so that the tape may be compressed to a greater extent in forming the sealing joint.

The present gasket tape may also be formed with fabric portions of the type shown in transverse section in Fig. 10, where the fabric portions are woven as a two-ply fabric during the weaving operation, and the filler threads 55 pass alternately from the top ply of the fabric to the lower ply of the fabric, thereby binding the two plies of the fabric together. The multiple ply woven fabric as distinguished from the folded multiple ply fabric shown in Fig. 4, requires a greater length of time in the weaving operation, due to the fact that the shuttle must traverse the warp threads twice as many times for producing the same length of tape. Therefore a wider fabric may be formed with a lesser number of shuttle operations, and when the wider fabric is folded over as shown in Fig. 4, any desired thickness or number of plies may be produced.

The present type of gasket may be employed without impregnation in places where a plain cloth gasket is sufficient, but the gasket is preferably impregnated with a rubber cement consisting of rubber stock and a rubber solvent, forming an initially plastic impregnating compound which should penetrate between the fibers, strands and threads of the fabric, and render the fabric impenetrable to ordinary liquids or gases. A zinc oxide filler may also be employed with the rubber cement and various other types of impregnation may be employed, such as resins, asphaltic compounds, petroleum compounds, phenolic condensation varnishes or other compounds, and in general the impregnating compound may be made to suit the particular conditions to which the gasket is to be subjected.

The impregnating compound also serves to secure the respective folds of fabric together as shown in Fig. 4 and to build up the fabric portions into any number of plies desired, the fabric serving as the vehicle and support which gives body to the gasket and carries the compound, whereas the compound is effective in producing a liquid-tight or gas-tight joint by virtue of its plasticity and impenetrability.

The proportions of the parts of the present gasket tape may be varied, depending on the type of joint to which the tape is to be adapted, or the width of the joint to be covered with the gasket.

Referring to Fig. 3, in this embodiment the fabric portions 27 and 28 have been made half as wide as the length of the joining threads 29 and it will thus be observed that when it is desired to make a substantially flat overlapping joint, the threads 29 may be folded together in such manner as to bring the fabric portions 27 and 28 of one end of the tape side by side above the joining threads 29 of the other end of the tape. The joint thus formed and shown in Fig. 3 is of substantially the same thickness as the gasket, since the threads 29 do not appreciably increase the bulk or thickness of the gasket where they overlap with the fabric portions 27 and 28, and it is thus possible to form an overlapping joint with a tape of the type shown without the necessity for any special labor.

Referring to Fig. 11, in this embodiment the widths of the fabric portions 27 and 28 have been made the same as the length of the joining threads 29, and thus one of the fabric portions 27 at one end of the tape may be located between the fabric portions 27 and 28 of the other end of the tape. An overlapping joint is thus formed which is also of substantially the same thickness as the tape, since the overlap is merely between the fabric and threads 29, and it is thus unnecessary to do any special fitting or cutting to form a gas-tight overlapped joint with a tape having the proportions illustrated in Fig. 11.

Fig. 12 illustrates another embodiment of an overlapped joint made with tape of the type shown in Fig. 4, but in this embodiment, the upper ply has been cut away from the end 56 of the tape, and the lower ply has been cut away from the end 57 of the tape, thereby permitting the two ends to overlap and form a two-ply overlapping joint.

The mode of application of the present gasket will be apparent from Figs. 1, 3, 11 and 12, in which the studs 23 have been placed between the joining threads 29. With the present gasket, it is only necessary to spread the threads 29 at any desired point and place the threads about the bolts or studs 23. The fabric portions 27 and 28 are preferably spaced sufficiently to receive the bolts 23 between them, and after the gasket has been applied to one bolt, the threads may be spread apart wherever the other bolts happen to be located.

The fabric portions 27 and 28 are thus located on opposite sides of the bolt to be clamped between the end ring 24 and the end plate 21 by the bolts 23, and since the bolts pass through the gasket, there is no possibility of the gasket slipping out from under the end plate.

It is therefore not necessary to cut any threads or waste any time in fitting the present gasket to any joint having projecting bolts, nor is it necessary to waste any of the material as is usually the case in cutting bolt holes. A considerable amount of time may thus be saved in the application of the present gasket and material is also saved by virtue of the elimination of errors, which frequently arise in the cutting of bolt holes.

The present gasket is sufficiently flexible when impregnated with a plastic compound, so that it may be curved about a circular joint or joints of any shape, in which case the inner fabric is slightly compressed together longitudinally and the outer fabric stretched longitudinally to conform to the shape of the curve.

The impregnated type of gasket may be sprinkled with graphite on one side, if desired, to permit convenient removal of the end plate, the sticky other side of the gasket holding the gasket in place, but if desired, for a tighter joint both sides of the gasket may be covered with impregnating compound of a sticky character.

It will thus be observed that I have invented an improved type of gasket tape which is peculiarly adapted to be used for front end gaskets on locomotives, but which may also be employed to advantage wherever projecting bolts or studs pass through the gaskets. The present gasket may be applied in a much shorter time and by less skilled labor than the gaskets of the prior art, and it is obviously unnecessary to carry in stock such a large number of gaskets, since the present gaskets may be kept in the form of a tape and cut to any length desired. While the preferred form of the gasket consists of a fabric employing a large percentage of asbestos, it should also be understood that the tape may be constructed or woven of any convenient type of fibers, depending on the use to which the tape is to be put.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a gasket, the combination of a woven fabric member having a pair of longitudinally extending woven bodies, and a plurality of threads joining said woven bodies and forming a tape of predetermined width, said threads being adapted to be spread to pass bolts or studs.

2. In a gasket, the combination of a woven fabric member having a pair of longitudinally extending woven bodies, and a plurality of threads joining said woven bodies and forming a tape of predetermined width, said threads being adapted to be spread to pass bolts or studs, and said threads extending diagonally across said tape with the ends of predetermined threads spaced from each other.

3. In a gasket, a woven fabric member comprising a plurality of warp threads, and a plurality of filler threads, the warp threads being located in series and the series of warp threads being spaced from each other, whereby the filler threads may be spread to form apertures in the gasket.

4. A gasket having a pair of longitudinally extending woven parts, said parts being spaced from each other a distance equal to the combined width of said parts, and flexible threads joining said parts whereby the two parts of one end of the gasket may be located between the parts of another end forming a substantially flat joint.

5. A gasket having a pair of longitudinally extending woven parts, said parts being spaced from each other a distance equal to the width of one of said parts, and flexible threads joining said parts whereby the ends of a gasket may be arranged in overlapping arrangement with one of the woven parts of one end between the woven parts of the other end.

6. A gasket comprising a pair of spaced woven members, joined by loose transverse threads which are adapted to be spread to pass a bolt, and an initially plastic impregnating compound on said gasket.

7. A gasket comprising a pair of spaced woven members, joined by slack transverse threads which are adapted to be spread to pass a bolt, said threads being formed of asbestos fibers twisted together, and rubber impregnating the threads of said gasket.

8. A gasket comprising a pair of spaced woven members, joined solely by transverse threads which are adapted to be spread to pass a bolt, said threads being formed of asbestos fibers twisted together, and rubber impregnating the threads of said gasket, the woven members being folded together longitudinally to form a multiple layer gasket.

9. A gasket tape comprising a plurality of interwoven asbestos threads, certain of said threads being arranged as series of warp threads, and the other threads being filler threads, said filler threads traversing one series of warp threads a plurality of times and then traversing the other series of warp threads a plurality of times forming two spaced portions of fabric joined by filler threads.

10. A gasket tape comprising a plurality of interwoven asbestos threads, certain of said threads being arranged as series of warp threads, and the other threads being filler threads, said filler threads traversing one series of warp threads a plurality of times and then traversing the other series of warp threads a plurality of times forming two spaced portions of fabric joined by filler threads, said threads having reinforcing wires twisted in with predetermined threads to increase the tensile strength of the gasket.

11. A gasket tape comprising a plurality of interwoven asbestos threads, certain of said threads being arranged as series of warp threads, and the other threads being filler threads, said filler threads traversing one series of warp threads a plurality of times and then traversing the other series of warp threads a plurality of times forming two spaced portions of fabric joined by filler threads, and a plastic compound impregnating said gasket.

12. In a gasket the combination of a pair of narrow woven strips formed of threads including asbestos fibers, said strips being of predetermined thickness, spaced to facilitate insertion of bolts between said strips and impregnated with a compound to prevent leakage, and a multiplicity of separate threads joining said narrow woven strips and holding them in predetermined spaced relation with respect to each other, said threads being adapted to be spread for the passage of bolts without the necessity for cutting threads.

13. A rubber-impregnated, heat-resistant, woven, gasketing tape comprising an outer portion including warp and filling strands and a central portion including filling strands only.

14. A gasketing tape including interwoven wire-inserted asbestos filling strands and plain asbestos warp strands and including outer edge portions comprising filling and warp strands and an inner portion containing filling strands only.

15. A gasketing tape including interwoven wire-inserted asbestos filling strands and asbestos warp strands and including outer edge portions comprising filling and warp strands and an inner portion containing filling strands only, the filling strands in the said inner portion being spaced farther apart than the filling strands in the said outer portions.

In witness whereof, I hereunto subscribe my name this 5th day of March, 1931.

WILLIAM R. GILLIES.